(12) United States Patent
Levy et al.

(10) Patent No.: US 10,819,621 B2
(45) Date of Patent: Oct. 27, 2020

(54) UNICAST FORWARDING OF ADAPTIVE-ROUTING NOTIFICATIONS

(71) Applicant: Mellanox Technologies TLV Ltd., Raanana (IL)

(72) Inventors: Gil Levy, Hod Hasharon (IL); Alex Shpiner, Nesher (IL); Benny Koren, Zichron Yaakov (IL)

(73) Assignee: MELLANOX TECHNOLOGIES TLV LTD., Ra'anana (IL)

( * ) Notice: Subject to any disclaimer, the term of this patent is extended or adjusted under 35 U.S.C. 154(b) by 50 days.

(21) Appl. No.: 15/050,480

(22) Filed: Feb. 23, 2016

(65) Prior Publication Data

US 2017/0244630 A1    Aug. 24, 2017

(51) Int. Cl.
| | | |
|---|---|---|
| H04L 12/703 | (2013.01) | |
| H04L 12/26 | (2006.01) | |
| H04L 12/707 | (2013.01) | |
| H04L 12/753 | (2013.01) | |

(52) U.S. Cl.
CPC .......... H04L 45/28 (2013.01); H04L 43/0811 (2013.01); H04L 45/22 (2013.01); H04L 45/48 (2013.01)

(58) Field of Classification Search
CPC ....... H04L 45/28; H04L 45/22; H04L 43/0811
See application file for complete search history.

(56) References Cited

U.S. PATENT DOCUMENTS

| | | |
|---|---|---|
| 4,312,064 A | 1/1982 | Bench et al. |
| 6,115,385 A | 9/2000 | Vig |
| 6,169,741 B1 | 1/2001 | Lemaire et al. |
| 6,480,500 B1 | 11/2002 | Erimli et al. |
| 6,532,211 B1 | 3/2003 | Rathonyi et al. |
| 6,553,028 B1 | 4/2003 | Tang et al. |
| 6,614,758 B2 | 9/2003 | Wong |
| 6,665,297 B1 | 12/2003 | Harigochi et al. |

(Continued)

FOREIGN PATENT DOCUMENTS

| | | |
|---|---|---|
| WO | 2012037494 A1 | 3/2012 |
| WO | 2016105446 A1 | 6/2016 |

OTHER PUBLICATIONS

Leiserson, C E., "Fat-Trees: Universal Networks for Hardware Efficient Supercomputing", IEEE Transactions on Computers, vol. C-34, No. 10, pp. 892-901, Oct. 1985.

(Continued)

*Primary Examiner* — Charles C Jiang
*Assistant Examiner* — Voster Preval
(74) *Attorney, Agent, or Firm* — Kligler & Associates Patent Attorneys Ltd

(57) ABSTRACT

A method for communication includes, in a first network switch that is part of a communication network having a topology, detecting a compromised ability to forward a flow of packets originating from a source endpoint to a destination endpoint. In response to detecting the compromised ability, the first network switch identifies, based on the topology, a second network switch that lies on a current route of the flow, and also lies on one or more alternative routes from the source endpoint to the destination endpoint that do not traverse the first network switch. A notification, which is addressed individually to the second network switch and requests the second network switch to reroute the flow, is sent from the first network switch.

16 Claims, 2 Drawing Sheets

(56) References Cited

U.S. PATENT DOCUMENTS

| | | |
|---|---|---|
| 6,775,268 B1 | 8/2004 | Wang et al. |
| 6,795,886 B1 | 9/2004 | Nguyen |
| 6,804,532 B1 | 10/2004 | Moon et al. |
| 6,807,175 B1 | 10/2004 | Jennings et al. |
| 6,831,918 B1 | 12/2004 | Kavak |
| 6,912,589 B1 | 6/2005 | Jain et al. |
| 6,912,604 B1 | 6/2005 | Tzeng et al. |
| 6,950,428 B1 | 9/2005 | Horst et al. |
| 7,010,607 B1 | 3/2006 | Bunton |
| 7,076,569 B1 | 7/2006 | Bailey et al. |
| 7,234,001 B2 | 6/2007 | Simpson et al. |
| 7,274,869 B1 | 9/2007 | Pan et al. |
| 7,286,535 B2 | 10/2007 | Ishikawa et al. |
| 7,676,597 B2 | 3/2010 | Kagan et al. |
| 7,746,854 B2 | 6/2010 | Ambe et al. |
| 7,899,930 B1 | 3/2011 | Turner et al. |
| 7,924,837 B1 | 4/2011 | Shabtay et al. |
| 7,936,770 B1 | 5/2011 | Frattura et al. |
| 7,969,980 B1 | 6/2011 | Florit et al. |
| 8,094,569 B2 | 1/2012 | Gunukula et al. |
| 8,175,094 B2 | 5/2012 | Bauchot et al. |
| 8,195,989 B1 | 6/2012 | Lu et al. |
| 8,213,315 B2 | 7/2012 | Crupnicoff et al. |
| 8,401,012 B2 | 3/2013 | Underwood et al. |
| 8,489,718 B1 | 7/2013 | Brar et al. |
| 8,495,194 B1 | 7/2013 | Brar et al. |
| 8,576,715 B2 | 11/2013 | Bloch et al. |
| 8,605,575 B2 | 12/2013 | Gunukula et al. |
| 8,621,111 B2 | 12/2013 | Marr et al. |
| 8,625,427 B1 | 1/2014 | Terry et al. |
| 8,681,641 B1 | 3/2014 | Sajassi et al. |
| 8,755,389 B1 | 6/2014 | Poutievski et al. |
| 8,774,063 B2 | 7/2014 | Beecroft |
| 8,873,567 B1 | 10/2014 | Mandal et al. |
| 8,908,704 B2 | 12/2014 | Koren et al. |
| 9,014,006 B2 | 4/2015 | Haramaty et al. |
| 9,042,234 B1 | 5/2015 | Liljenstolpe et al. |
| 9,571,400 B1 | 2/2017 | Mandal et al. |
| 2001/0043614 A1 | 11/2001 | Viswanadham et al. |
| 2002/0009073 A1 | 1/2002 | Furukawa et al. |
| 2002/0013844 A1 | 1/2002 | Garrett et al. |
| 2002/0026525 A1 | 2/2002 | Armitage |
| 2002/0039357 A1 | 4/2002 | Lipasti et al. |
| 2002/0071439 A1 | 6/2002 | Reeves et al. |
| 2002/0085586 A1 | 7/2002 | Tzeng |
| 2002/0136163 A1 | 9/2002 | Kawakami et al. |
| 2002/0138645 A1* | 9/2002 | Shinomiya ............... H04L 29/06 709/238 |
| 2002/0141412 A1 | 10/2002 | Wong |
| 2002/0165897 A1 | 11/2002 | Kagan et al. |
| 2002/0176363 A1 | 11/2002 | Durinovic-Johri et al. |
| 2003/0016624 A1 | 1/2003 | Bare |
| 2003/0039260 A1 | 2/2003 | Fujisawa |
| 2003/0065856 A1 | 4/2003 | Kagan et al. |
| 2003/0079005 A1 | 4/2003 | Myers et al. |
| 2003/0097438 A1 | 5/2003 | Bearden et al. |
| 2003/0223453 A1 | 12/2003 | Stoler et al. |
| 2004/0024903 A1 | 2/2004 | Costatino et al. |
| 2004/0062242 A1 | 4/2004 | Wadia et al. |
| 2004/0111651 A1 | 6/2004 | Mukherjee et al. |
| 2004/0202473 A1 | 10/2004 | Nakamura et al. |
| 2005/0013245 A1 | 1/2005 | Sreemanthula et al. |
| 2005/0154790 A1 | 7/2005 | Nagata et al. |
| 2005/0157641 A1 | 7/2005 | Roy |
| 2005/0259588 A1 | 11/2005 | Preguica |
| 2006/0126627 A1 | 6/2006 | Diouf |
| 2006/0143300 A1 | 6/2006 | See et al. |
| 2006/0182034 A1 | 8/2006 | Klinker et al. |
| 2006/0215645 A1 | 9/2006 | Kangyu |
| 2006/0291480 A1 | 12/2006 | Cho et al. |
| 2007/0030817 A1 | 2/2007 | Arunachalam et al. |
| 2007/0058536 A1 | 3/2007 | Vaananen et al. |
| 2007/0058646 A1 | 3/2007 | Hermoni |
| 2007/0070998 A1 | 3/2007 | Sethuram et al. |
| 2007/0091911 A1 | 4/2007 | Watanabe et al. |
| 2007/0104192 A1 | 5/2007 | Yoon et al. |
| 2007/0183418 A1 | 8/2007 | Riddoch et al. |
| 2007/0223470 A1 | 9/2007 | Stahl |
| 2007/0237083 A9 | 10/2007 | Oh et al. |
| 2008/0002690 A1 | 1/2008 | Ver Steeg et al. |
| 2008/0101378 A1 | 5/2008 | Krueger |
| 2008/0112413 A1 | 5/2008 | Pong |
| 2008/0165797 A1 | 7/2008 | Aceves |
| 2008/0186981 A1 | 8/2008 | Seto et al. |
| 2008/0189432 A1 | 8/2008 | Abali et al. |
| 2008/0267078 A1 | 10/2008 | Farinacci et al. |
| 2008/0298248 A1 | 12/2008 | Roeck et al. |
| 2009/0010159 A1 | 1/2009 | Brownell et al. |
| 2009/0022154 A1 | 1/2009 | Kiribe et al. |
| 2009/0097496 A1 | 4/2009 | Nakamura et al. |
| 2009/0103534 A1 | 4/2009 | Malledant et al. |
| 2009/0119565 A1 | 5/2009 | Park et al. |
| 2009/0262741 A1 | 10/2009 | Jungck et al. |
| 2010/0020796 A1 | 1/2010 | Park et al. |
| 2010/0039959 A1 | 2/2010 | Gilmartin |
| 2010/0049942 A1 | 2/2010 | Kim et al. |
| 2010/0111529 A1 | 5/2010 | Zeng et al. |
| 2010/0141428 A1 | 6/2010 | Mildenberger et al. |
| 2010/0216444 A1 | 8/2010 | Mariniello et al. |
| 2010/0284404 A1 | 11/2010 | Gopinath et al. |
| 2010/0290385 A1 | 11/2010 | Ankaiah et al. |
| 2010/0290458 A1 | 11/2010 | Assarpour et al. |
| 2010/0315958 A1 | 12/2010 | Luo et al. |
| 2011/0019673 A1 | 1/2011 | Fernandez |
| 2011/0080913 A1 | 4/2011 | Liu et al. |
| 2011/0085440 A1 | 4/2011 | Owens et al. |
| 2011/0085449 A1 | 4/2011 | Jeyachandran et al. |
| 2011/0090784 A1 | 4/2011 | Gan |
| 2011/0164496 A1 | 7/2011 | Loh et al. |
| 2011/0164518 A1* | 7/2011 | Daraiseh ............... H04L 45/121 370/252 |
| 2011/0225391 A1 | 9/2011 | Burroughs et al. |
| 2011/0249679 A1 | 10/2011 | Lin et al. |
| 2011/0255410 A1 | 10/2011 | Yamen et al. |
| 2011/0265006 A1 | 10/2011 | Morimura et al. |
| 2011/0299529 A1 | 12/2011 | Olsson et al. |
| 2012/0020207 A1* | 1/2012 | Corti ........................ H04L 45/02 370/225 |
| 2012/0075999 A1 | 3/2012 | Ko et al. |
| 2012/0082057 A1 | 4/2012 | Welin et al. |
| 2012/0144064 A1 | 6/2012 | Parker et al. |
| 2012/0144065 A1 | 6/2012 | Parker et al. |
| 2012/0147752 A1 | 6/2012 | Ashwood-Smith et al. |
| 2012/0163797 A1 | 6/2012 | Wang |
| 2012/0170582 A1 | 7/2012 | Abts et al. |
| 2012/0207175 A1 | 8/2012 | Raman et al. |
| 2012/0287791 A1 | 11/2012 | Xi et al. |
| 2012/0300669 A1 | 11/2012 | Zahavi |
| 2012/0314706 A1 | 12/2012 | Liss |
| 2013/0044636 A1 | 2/2013 | Koponen et al. |
| 2013/0071116 A1 | 3/2013 | Ong |
| 2013/0083701 A1 | 4/2013 | Tomic et al. |
| 2013/0114599 A1 | 5/2013 | Arad |
| 2013/0114619 A1 | 5/2013 | Wakumoto |
| 2013/0159548 A1* | 6/2013 | Vasseur ................. H04L 45/125 709/239 |
| 2013/0170451 A1 | 7/2013 | Krause et al. |
| 2013/0204933 A1 | 8/2013 | Cardona et al. |
| 2013/0208720 A1 | 8/2013 | Ellis et al. |
| 2013/0242745 A1 | 9/2013 | Umezuki |
| 2013/0297757 A1 | 11/2013 | Han et al. |
| 2013/0301646 A1 | 11/2013 | Bogdanski et al. |
| 2013/0315237 A1 | 11/2013 | Kagan et al. |
| 2013/0322256 A1 | 12/2013 | Bader et al. |
| 2013/0329727 A1 | 12/2013 | Rajagopalan et al. |
| 2013/0336116 A1 | 12/2013 | Vasseur et al. |
| 2013/0336164 A1 | 12/2013 | Yang et al. |
| 2014/0016457 A1* | 1/2014 | Enyedi ..................... H04L 45/22 370/225 |
| 2014/0022942 A1 | 1/2014 | Han et al. |
| 2014/0043959 A1 | 2/2014 | Owens et al. |
| 2014/0059440 A1 | 2/2014 | Sasaki et al. |
| 2014/0105034 A1* | 4/2014 | Sun ......................... H04L 45/18 370/249 |

(56) References Cited

U.S. PATENT DOCUMENTS

| | | | |
|---|---|---|---|
| 2014/0140341 A1 | 5/2014 | Bataineh et al. | |
| 2014/0169173 A1* | 6/2014 | Naouri | H04L 47/10 370/237 |
| 2014/0192646 A1 | 7/2014 | Mir et al. | |
| 2014/0198636 A1 | 7/2014 | Thayalan et al. | |
| 2014/0211631 A1* | 7/2014 | Haramaty | H04L 47/122 370/237 |
| 2014/0269305 A1* | 9/2014 | Nguyen | H04L 45/28 370/235 |
| 2014/0313880 A1 | 10/2014 | Lu et al. | |
| 2014/0328180 A1 | 11/2014 | Kim et al. | |
| 2014/0343967 A1 | 11/2014 | Baker | |
| 2015/0030033 A1 | 1/2015 | Vasseur et al. | |
| 2015/0052252 A1 | 2/2015 | Gilde et al. | |
| 2015/0092539 A1 | 4/2015 | Sivabalan et al. | |
| 2015/0098466 A1 | 4/2015 | Haramaty et al. | |
| 2015/0124815 A1 | 5/2015 | Beliveau et al. | |
| 2015/0127797 A1 | 5/2015 | Attar et al. | |
| 2015/0131663 A1 | 5/2015 | Brar et al. | |
| 2015/0163144 A1 | 6/2015 | Koponen et al. | |
| 2015/0172070 A1 | 6/2015 | Csaszar | |
| 2015/0194215 A1 | 7/2015 | Douglas et al. | |
| 2015/0195204 A1 | 7/2015 | Haramaty et al. | |
| 2015/0249590 A1* | 9/2015 | Gusat | H04L 45/48 370/392 |
| 2015/0372898 A1 | 12/2015 | Haramaty et al. | |
| 2015/0372916 A1 | 12/2015 | Haramaty et al. | |
| 2016/0014636 A1 | 1/2016 | Bahr et al. | |
| 2016/0043933 A1 | 2/2016 | Gopalarathnam | |
| 2016/0080120 A1 | 3/2016 | Unger et al. | |
| 2016/0080321 A1 | 3/2016 | Pan et al. | |
| 2016/0182378 A1 | 6/2016 | Basavaraja et al. | |
| 2017/0054591 A1* | 2/2017 | Hyoudou | H04L 41/0668 |
| 2017/0358111 A1 | 12/2017 | Madsen | |
| 2018/0139132 A1 | 5/2018 | Edsall et al. | |
| 2020/0042667 A1 | 2/2020 | Swaminathan et al. | |

OTHER PUBLICATIONS

Ohring et al., "On Generalized Fat Trees", Proceedings of the 9th International Symposium on Parallel Processing, pp. 37-44, Santa Barbara, USA, Apr. 25-28, 1995.

Zahavi, E., "D-Mod-K Routing Providing Non-Blocking Traffic for Shift Permutations on Real Life Fat Trees", CCIT Technical Report #776, Technion—Israel Institute of Technology, Haifa, Israel, Aug. 2010.

Yuan et al., "Oblivious Routing for Fat-Tree Based System Area Networks with Uncertain Traffic Demands", Proceedings of ACM SIGMETRICS—the International Conference on Measurement and Modeling of Computer Systems, pp. 337-348, San Diego, USA, Jun. 12-16, 2007.

Matsuoka S., "You Don't Really Need Big Fat Switches Anymore—Almost", IPSJ SIG Technical Reports, vol. 2003, No. 83, pp. 157-162, year 2003.

Kim et al., "Technology-Driven, Highly-Scalable Dragonfly Topology", 35th International Symposium on Computer Architecture, pp. 77-78, Beijing, China, Jun. 21-25, 2008.

Jiang et al., "Indirect Adaptive Routing on Large Scale Interconnection Networks", 36th International Symposium on Computer Architecture, pp. 220-231, Austin, USA, Jun. 20-24, 2009.

Minkenberg et al., "Adaptive Routing in Data Center Bridges", Proceedings of 17th IEEE Symposium on High Performance Interconnects, New York, USA, pp. 33-41, Aug. 25-27, 2009.

Kim et al., "Adaptive Routing in High-Radix Clos Network", Proceedings of the 2006 ACM/IEEE Conference on Supercomputing (SC2006), Tampa, USA, Nov. 2006.

Infiniband Trade Association, "InfiniBandTM Architecture Specification vol. 1", Release 1.2.1, Nov. 2007.

Culley et al., "Marker PDU Aligned Framing for TCP Specification", IETF Network Working Group, RFC 5044, Oct. 2007.

Shah et al., "Direct Data Placement over Reliable Transports", IETF Network Working Group, RFC 5041, Oct. 2007.

Martinez et al., "Supporting fully adaptive routing in Infiniband networks", Proceedings of the International Parallel and Distributed Processing Symposium (IPDPS'03),Apr. 22-26, 2003.

Joseph, S., "Adaptive routing in distributed decentralized systems: NeuroGrid, Gnutella & Freenet", Proceedings of Workshop on Infrastructure for Agents, MAS and Scalable MAS, Montreal, Canada, 11 pages, year 2001.

Gusat et al., "R3C2: Reactive Route & Rate Control for CEE", Proceedings of 18th IEEE Symposium on High Performance Interconnects, New York, USA, pp. 50-57, Aug. 10-27, 2010.

Wu et al., "DARD: Distributed adaptive routing datacenter networks", Proceedings of IEEE 32nd International Conference Distributed Computing Systems, pp. 32-41, Jun. 18-21, 2012.

Ding et al., "Level-wise scheduling algorithm for fat tree interconnection networks", Proceedings of the 2006 ACM/IEEE Conference on Supercomputing (SC 2006), 9 pages, Nov. 2006.

U.S. Appl. No. 14/046,976 Office Action dated Jun. 2, 2015.

Li et al., "Multicast Replication Using Dual Lookups in Large Packet-Based Switches", 2006 IET International Conference on Wireless, Mobile and Multimedia Networks, pp. 1-3, Nov. 6-9, 2006.

Nichols et al., "Definition of the Differentiated Services Field (DS Field) in the IPv4 and IPv6 Headers", Network Working Group, RFC 2474, 20 pages, Dec. 1998.

Microsoft., "How IPv4 Multicasting Works", 22 pages, Mar. 28, 2003.

Suchara et al., "Network Architecture for Joint Failure Recovery and Traffic Engineering", Proceedings of the ACM SIGMETRICS joint international conference on Measurement and modeling of computer systems, pp. 97-108, Jun. 7-11, 2011.

IEEE 802.1Q, "IEEE Standard for Local and metropolitan area networks Virtual Bridged Local Area Networks", IEEE Computer Society, 303 pages, May 19, 2006.

Plummer, D., "An Ethernet Address Resolution Protocol," Network Working Group ,Request for Comments (RFC) 826, 10 pages, Nov. 1982.

Hinden et al., "IP Version 6 Addressing Architecture," Network Working Group ,Request for Comments (RFC) 2373, 26 pages, Jul. 1998.

U.S. Appl. No. 12/910,900 Office Action dated Apr. 9, 2013.

U.S. Appl. No. 14/046,976 Office Action dated Jan. 14, 2016.

Raindel et al., U.S. Appl. No. 14/673,892, filed Mar. 31, 2015.

"Equal-cost multi-path routing", Wikipedia, 2 pages, Oct. 13, 2014.

Thaler et al., "Multipath Issues in Unicast and Multicast Next-Hop Selection", Network Working Group, RFC 2991, 9 pages, Nov. 2000.

Nkposong et al., "Experiences with BGP in Large Scale Data Centers:Teaching an old protocol new tricks", 44 pages, Jan. 31, 3014.

Mahalingam et al., "VXLAN: A Framework for Overlaying Virtualized Layer 2 Networks over Layer 3 Networks", Internet Draft, 20 pages, Aug. 22, 2012.

Sinha et al., "Harnessing TCP's Burstiness with Flowlet Switching", 3rd ACM SIGCOMM Workshop on Hot Topics in Networks (HotNets), 6 pages, Nov. 11, 2004.

Vishnu et al., "Hot-Spot Avoidance With Multi-Pathing Over InfiniBand: An MPI Perspective", Seventh IEEE International Symposium on Cluster Computing and the Grid (CCGrid'07), 8 pages, year 2007.

NOWLAB—Network Based Computing Lab, 2 pages, years 2002-2015 http://nowlab.cse.ohio-state.edu/publications/conf-presentations/2007/vishnu-ccgrid07.pdf.

Alizadeh et al.,"CONGA: Distributed Congestion-Aware Load Balancing for Datacenters", Cisco Systems, 12 pages, Aug. 9, 2014.

Geoffray et al., "Adaptive Routing Strategies for Modern High Performance Networks", 16th IEEE Symposium on High Performance Interconnects (HOTI '08), pp. 165-172, Aug. 26-28, 2008.

Anderson et al., "On the Stability of Adaptive Routing in the Presence of Congestion Control", IEEE INFOCOM, 11 pages, 2003.

(56) References Cited

OTHER PUBLICATIONS

Perry et al., "Fastpass: A Centralized "Zero-Queue" Datacenter Network", M.I.T. Computer Science & Artificial Intelligence Lab, 12 pages, year 2014.
Glass et al., "The turn model for adaptive routing", Journal of the ACM, vol. 41, No. 5, pp. 874-903, Sep. 1994.
U.S. Appl. No. 14/662,259 Office Action dated Sep. 22, 2016.
Afek et al., "Sampling and Large Flow Detection in SDN", SIGCOMM '15, pp. 345-346, Aug. 17-21, 2015, London, UK.
Haramaty et al., U.S. Appl. No. 14/970,608, filed Dec. 16, 2015.
U.S. Appl. No. 14/745,488 Office Action dated Dec. 6, 2016.
U.S. Appl. No. 14/337,334 Office Action dated Oct. 20, 2016.
Dally et al., "Deadlock-Free Message Routing in Multiprocessor Interconnection Networks", IEEE Transactions on Computers, vol. C-36, No. 5, May 1987, pp. 547-553.
Prisacari et al., "Performance implications of remote-only load balancing under adversarial traffic in Dragonflies", Proceedings of the 8th International Workshop on Interconnection Network Architecture: On-Chip, Multi-Chip, 4 pages, Jan. 22, 2014.
Garcia et al., "On-the-Fly 10 Adaptive Routing in High-Radix Hierarchical Networks," Proceedings of the 2012 International Conference on Parallel Processing (ICPP), pp. 279-288, Sep. 10-13, 2012.
Zahavi et al., "Distributed Adaptive Routing for Big-Data Applications Running on Data Center Networks," Proceedings of the Eighth ACM/IEEE Symposium on Architectures for Networking and Communication Systems, New York, USA, pp. 99-110, Oct. 29-30, 2012.
U.S. Appl. No. 14/732,853 Office Action dated Jan. 26, 2017.
U.S. Appl. No. 14/970,608 Office Action dated May 30, 2017.
U.S. Appl. No. 14/673,892 Office Action dated Jun. 1, 2017.
U.S. Appl. No. 14/970,608 office action dated Nov. 1, 2017.
U.S. Appl. No. 15/152,077 office action dated Dec. 1, 2017.
U.S. Appl. No. 15/387,718 office action dated Mar. 9, 2018.
U.S. Appl. No. 15/356,588 office action dated Jul. 11, 2018.
U.S. Appl. No. 15/152,077 office action dated Jul. 16, 2018.
U.S. Appl. No. 15/356,588 office action dated Feb. 7, 2019.
U.S. Appl. No. 15/218,028 office action dated Feb. 6, 2019.
U.S. Appl. No. 15/356,588 Advisory Action dated May 23, 2019.
U.S. Appl. No. 15/896,088 office action dated Jun. 12, 2019.
U.S. Appl. No. 15/356,588 office action dated Aug. 12, 2019.
U.S. Appl. No. 15/218,028 office action dated Jun. 26, 2019.
CN Application # 2017100777076 office action dated Nov. 1, 2019.
Cao et al., "Implementation Method for High-radix Fat-tree Deterministic Source-routing Interconnection Network", Computer Science, vol. 39, Issue 12, pp. 33-37, 2012.
U.S. Appl. No. 16/240,749 office action dated Jul. 28, 2020.

\* cited by examiner

UNICAST FORWARDING OF ADAPTIVE-ROUTING NOTIFICATIONS

FIELD OF THE INVENTION

The present invention relates generally to communication networks, and particularly to methods and systems for forwarding of adaptive-routing notifications.

BACKGROUND OF THE INVENTION

Various techniques for routing packets through communication networks are known in the art. Some known techniques select routing paths for packets based on the network state, e.g., traffic load or congestion. Such techniques are sometimes referred to as Adaptive Routing (AR). For example, U.S. Pat. No. 8,576,715, whose disclosure is incorporated herein by reference, describes a method for communication that includes routing a first packet, which belongs to a given packet flow, over a first routing path through a communication network. A second packet, which follows the first packet in the given packet flow, is routed using a time-bounded Adaptive Routing (AR) mode, by evaluating a time gap between the first and second packets, routing the second packet over the first routing path if the time gap does not exceed a predefined threshold, and, if the time gap exceeds the predefined threshold, selecting a second routing path through the communication network that is potentially different from the first routing path, and routing the second packet over the second routing path.

U.S. Patent Application Publication 2015/0372916, whose disclosure is incorporated herein by reference, describes a network element that includes circuitry and one or more interfaces. The interfaces are configured to connect to a communication network. The circuitry is configured to assign multiple egress interfaces corresponding to respective different paths via the communication network for routing packets to a given destination-address group, to hold, for the given destination-address group, respective state information for each of multiple sets of hash results, to receive via an ingress interface a packet destined to the given destination-address group, to calculate a given hash result for the packet and identify a given set of hash results in which the given hash result falls, and to forward the packet via one of the multiple egress interfaces in accordance with the state information corresponding to the given destination-address group and the given set of hash results.

U.S. Pat. No. 9,014,006 and U.S. Patent Application Publication 2015/0195204, whose disclosures are incorporated herein by reference, describe a method including receiving in a network switch of a communication network communication traffic that originates from a source node and arrives over a route through the communication network traversing one or more preceding network switches, for forwarding to a destination node. In response to detecting in the network switch a compromised ability to forward the communication traffic to the destination node, a notification is sent to the preceding network switches. The notification is to be consumed by the preceding network switches and requests the preceding network switches to modify the route so as not to traverse the network switch.

SUMMARY OF THE INVENTION

An embodiment that is described herein provides a method for communication including, in a first network switch that is part of a communication network having a topology, detecting a compromised ability to forward a flow of packets originating from a source endpoint to a destination endpoint. In response to detecting the compromised ability, the first network switch identifies, based on the topology, a second network switch that lies on a current route of the flow, and also lies on one or more alternative routes from the source endpoint to the destination endpoint that do not traverse the first network switch. A notification, which is addressed individually to the second network switch and requests the second network switch to reroute the flow, is sent from the first network switch.

In some embodiments, the method further includes receiving the notification by the second network switch, and, in response to the notification, rerouting the flow to one of the alternative routes. In an embodiment, sending the notification includes routing the notification over a route that differs from a reverse of the current route of the flow.

In some embodiments, the topology is a Fat-Tree (FT) topology, in which network switches are arranged in multiple levels including at least a leaf level and a spine level, and in which each route initially traverses an upwards segment that begins at the leaf level and traverses increasing levels, and then traverses a downwards segment that traverses decreasing levels and ends at the leaf level. In an example embodiment, the first network switch belongs to a given level of the FT topology, and identifying the second network switch includes selecting, in an intermediate level that is lower than the given level, an only network switch that lies on the upwards segment of the current route of the flow. In a disclosed embodiment, the intermediate level is one level lower than the given level.

In some embodiments, identifying the second network switch includes holding in the first network switch a data structure that records, per endpoint, a respective network switch in the intermediate level that lies on the upwards segment of a route from that endpoint to the first network switch, and querying the data structure for the network switch associated with the source endpoint. In an embodiment, the data structure is also used for routing packets from the first network switch to destination endpoints. In other embodiments, identifying the second network switch and sending the notification include identifying two or more second switches, and sending respective unicast notifications to the identified two or more second switches.

There is additionally provided, in accordance with an embodiment of the present invention, a network switch in a communication network having a topology. The network switch include multiple ports configured to exchange packets with the communication network, and packet processing circuitry. The packet processing circuitry is configured to detect a compromised ability to forward via the ports a flow of packets originating from a source endpoint to a destination endpoint, to identify, in response to detecting the compromised ability, based on the topology, a second network switch that lies on a current route of the flow, and also lies on one or more alternative routes from the source endpoint to the destination endpoint that do not traverse the network switch, and to send via one of the ports a notification, which is addressed individually to the second network switch and requests the second network switch to reroute the flow.

There is further provided, in accordance with an embodiment of the present invention, a computer software product, the product including a tangible non-transitory computer-readable medium in which program instructions are stored, which instructions, when read by a processor in a first network switch that is part of a communication network having a topology, cause the processor to detect a compromised ability to forward a flow of packets originating from a source endpoint to a destination endpoint, to identify, in response to the compromised ability, based on the topology, a second network switch that lies on a current route of the flow, and also lies on one or more alternative routes from the source endpoint to the destination endpoint that do not traverse the first network switch, and to send from the first network switch a notification, which is addressed individually to the second network switch and requests the second network switch to reroute the flow.

The present invention will be more fully understood from the following detailed description of the embodiments thereof, taken together with the drawings in which:

DETAILED DESCRIPTION OF EMBODIMENTS

Overview

Figure 1:
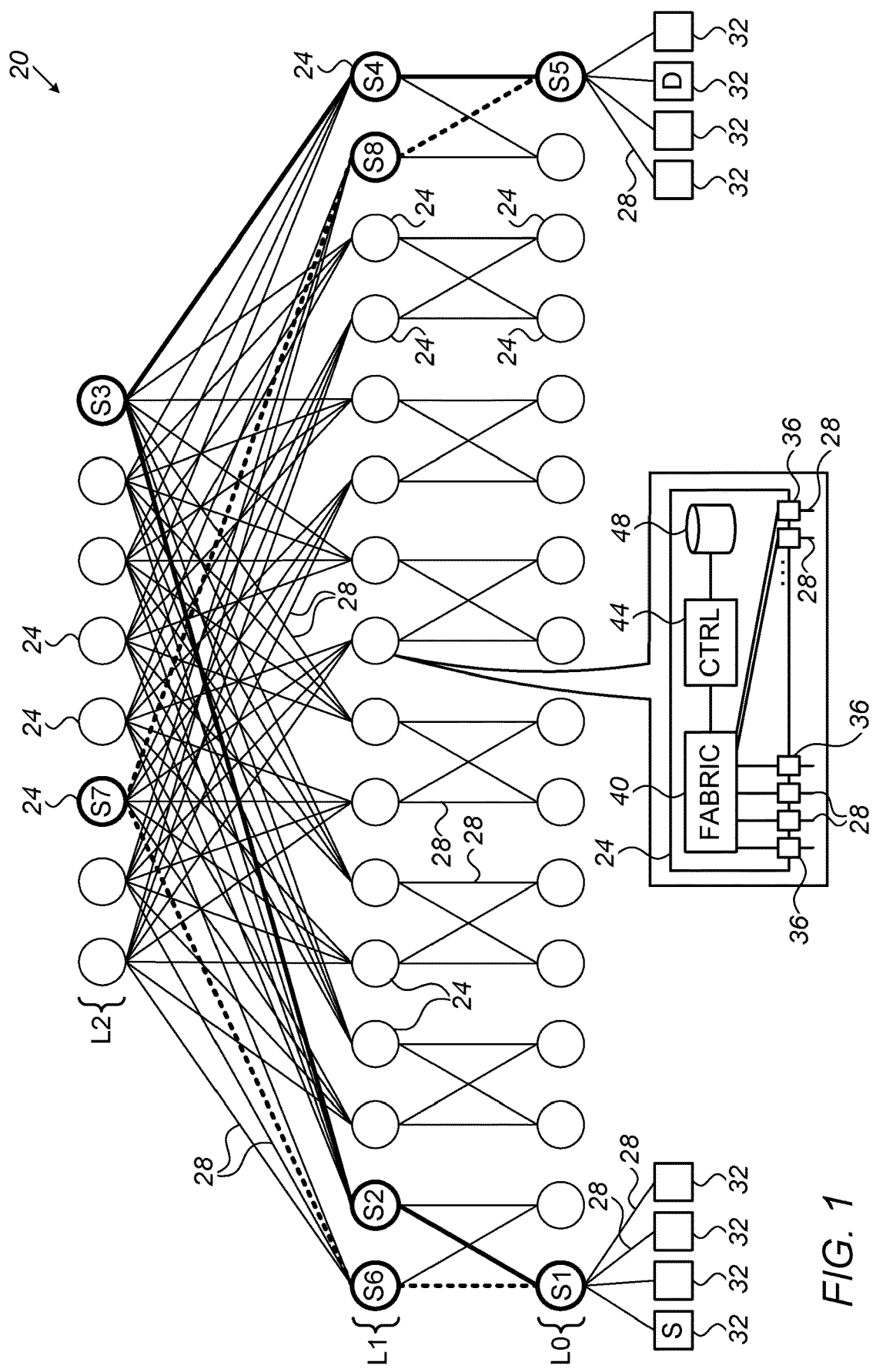
FIG. 1 is a block diagram that schematically illustrates a Fat-Tree (FT) network, in accordance with an embodiment of the present invention.

Embodiments of the present invention that are described herein provide improved methods and systems for adaptive routing of packets in communication networks. The embodiments described herein refer mainly to multi-level full FT networks. The disclosed techniques, however, are also applicable in other suitable network topologies such as quasi-FT networks, networks that use Multi-chassis Link Aggregation (MLAG), and multi-port hosts.

In some embodiments, a FT network comprises multiple interconnected network switches that are arranged in levels. The endpoints, i.e., the hosts served by the network, are connected to the switches in the lowest level, also referred to as leaf switches. The switches in the highest level are referred to as spine switches.

Any route through the FT network comprises an "upwards" segment followed by a "downwards" segment. The upwards segment begins at the leaf switch that serves the source endpoint, and proceeds upwards in the order of levels. The downwards segment proceeds downwards in the order of levels, until reaching the leaf switch that serves the destination endpoint.

As will be shown and demonstrated below, full FT networks have the following properties:

When routing packets upwards, a switch always has a choice of two or more possible routes en-route to a given destination endpoint. In the downwards direction, on the other hand, a given destination endpoint is reachable from a given switch over only a single possible route.

In a given switch in level X, the source address of a packet received from a higher-level switch uniquely defines the switch in level X−1 that forwarded that packet upwards.

The embodiments described herein provide a high-performance adaptive routing scheme that exploits these properties. The description that follows refers to full FT networks simply as FT networks, for the sake of clarity. Generalization to Quasi-FT and other network topologies is addressed further below.

In some embodiments, a current route is set-up for forwarding a flow of packets from a source endpoint to a destination endpoint. At some point in time, a switch along the downwards segment of the current route identifies congestion on the output port used for forwarding the flow, and is therefore compromised in its ability to continue forwarding the packets of the flow over the current route.

Since the congested switch is part of the downwards segment of a full FT network, it cannot reroute the flow locally via a different port. Instead, the congested switch identifies an alternative switch that will reroute the flow. The identified switch (referred to as the "rerouting switch") belongs to the next-lower level of the FT network and is part of the upwards segment of the current route. In accordance with the FT properties above, this choice guarantees that the rerouting switch has at least one alternative routing option. Moreover, for the particular congested switch, the identity of the rerouting switch is defined uniquely by the identity of the source endpoint (and thus by the source address specified in the packets of the flow).

Typically, the congested switch holds a database that specifies a respective rerouting switch per source endpoint. The congested switch identifies the rerouting switch by querying the database with the source address extracted from the packets of the flow. In some embodiments the same database already exists in the congested switch, for routing packets in the opposite direction. In such embodiments, the database does not need to be created and maintained for the purpose of adaptive routing. An additional attribute may be added, per source address, specifying the address of the rerouting switch to be selected.

Having identified the rerouting switch, the congested switch generates and sends an Adaptive Routing Notification (ARN) that requests the rerouting switch to reroute the flow. The ARN typically comprises a unicast packet that is addressed individually to the rerouting switch. In response to receiving the ARN, the rerouting switch reroutes the flow to an alternative route that reaches the destination endpoint but does not traverse the congested switch.

Unlike other possible solutions, the techniques described herein do not involve sending a notification hop-by-hop in the reverse direction of the current route, or any multicast notification, in an attempt to find a suitable rerouting switch. Instead, in the disclosed embodiments the congested switch uses its knowledge of the network topology to select the appropriate rerouting switch, and then sends a unicast notification that is addressed to that switch. The disclosed techniques are therefore fast and accurate, and incur little traffic overhead.

System Description

FIG. 1 is a block diagram that schematically illustrates a communication network 20, in accordance with an embodiment of the present invention. Network 20 comprises multiple network switches 24 that are interconnected by network links 28. Network 20 provides connectivity and communication services to multiple endpoints 32.

Endpoints 32, also referred to as hosts, may comprise any suitable computing platforms such as servers, workstations or personal computers. Network 20 may operate in accordance with any suitable communication protocol, such as Ethernet or Infiniband.

Switches 24 may comprise network switches, routers or any other suitable network elements that route or forward packets. In the context of the present patent application and in the claims, the terms "switch" and "network switch" refer to any such network element. In most of the embodiments described herein, including the example of FIG. 1, network 20 has a Fat-Tree (FT) topology. In the FT topology, switches 24 are arranged in two or more levels, denoted L0, L1, L2, . . . . Endpoints 32 are connected to switches 24 in the lowest level, denoted L0. This level is referred to as the leaf level. The highest level, in the present example L2, is referred to as the spine level.

An inset at the bottom of FIG. 1 shows the internal structure of switches 24. In this embodiment, each switch comprises multiple ports 36, a switch fabric 40, a control unit 44 and a memory 48. Ports 36 are connected to respective network links 28, and are configured to send and receive packets to and from the network (e.g., to or from an adjacent switch 24 or an endpoint 32). Fabric 40 is configured to forward packets between ports 36. Control unit 44 is configured to control and manage switch 24, including configuring fabric 40 to apply the desired forwarding operations. Memory 48 is configured to store forwarding tables and/or other relevant information.

The configurations of network 20 and switches 24 shown in FIG. 1 are example configurations that are depicted purely for the sake of conceptual clarity. In alternative embodiments, any other suitable network and/or switch configuration can be used. For example, although FIG. 1 shows a three-level FT network, the disclosed techniques can be used in FT networks having any other suitable number of levels. Further alternatively, the disclosed techniques are not limited to FT networks, and can be used in networks having other suitable topologies.

The different elements of switches 24 may be implemented using any suitable hardware, such as in an Application-Specific Integrated Circuit (ASIC) or Field-Programmable Gate Array (FPGA). Memory 48 may comprise, for example, a Random Access Memory (RAM), a Flash memory or other suitable type of memory. In some embodiments, some elements of switches 24 can be implemented using software, or using a combination of hardware and software elements. In the context of the present patent application and in the claims, fabric 40, control unit 44 and memory 48 are referred to as packet processing circuitry that carries out the disclosed techniques. In alternative embodiments, the packet processing circuitry can be implemented in any other suitable manner.

In some embodiments, control units 44 of switches 24 comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Generating Unicast Congestion Notifications

In an FT network, any route from a source endpoint to a destination endpoint comprises an "upwards" segment followed by a "downwards" segment. The upwards segment begins at the switch that serves the source endpoint in the leaf level L0, and proceeds upwards in the order of levels (but not necessarily all the way to the spine level). The downwards segment proceeds downwards in the order of levels, until reaching the switch that serves the destination endpoint in the leaf level L0.

Consider, for example, a route shown in bold in FIG. 1, from a source endpoint 32 denoted S to a destination endpoint 32 denoted D. The upwards segment of this route traverses switches denoted S1, S2 and S3. The downwards segment of this route traverses switches denoted S3, S4 and S5. Another possible route from S to D, marked with dashed lines in the figure, has an upwards segment that traverses switches denoted S1, S6 and S7, and then a downwards segment that traverses switches denoted S7, S8 and S5.

Generally, the full-FT topology has the following properties:

Property I: In the upwards direction, switches always have a choice of two or more possible routes en-route to a given destination endpoint. In the downwards direction, on the other hand, a given destination endpoint is reachable from a given switch over only a single possible route.

Property II: For a given destination endpoint, any routing decision taken by a switch along the upwards segment unambiguously defines the highest-level switch to be traversed, and the entire downwards segment of the route.

Property III: For a given source endpoint, and for a given switch in a level X along the downward segment of a route, the upwards segment can only traverse a single possible switch in any level lower than X. In particular, for a given switch in level X along the downward segment, the upwards segment can only traverse one possible switch in level X−1. Thus, in a given switch in level X, the source address of a packet received from a higher-level switch uniquely defines the switch in level X−1 that forwarded that packet upwards. This property is based on a more fundamental property—A packet forwarded downwards via a specific switch in level X uniquely defines (for a given source address) another switch in level X via which the packet was forwarded upwards. For a specific source address, to pass via a specific switch at level X in the upward segment, there is only a single possible choice of a switch at level X−1 in the upward segment.

In some embodiments of the present invention, switches 24 carry out an adaptive routing scheme that exploits the above properties. Consider a flow of packets that originates from a source endpoint S and is destined to a destination endpoint D. The flow is initially routed through FT network 20 along a certain route having an upwards segment and a downwards segment.

In an example embodiment, a switch 24 that lies on the downwards segment of the route encounters congestion at the output port it uses to forward the flow downwards. The congestion prevents the switch from continuing to forward the packets of the flow over the current route. Since the switch in question is on the downwards segment, it cannot choose an alternative route that reaches the same destination endpoint (see PROPERTY I above).

In order to recover from this situation, the switch selects an alternative switch along the current route, and requests the alternative switch to reroute the flow. In the description that follows, the former switch is referred to as the congested switch, and the latter switch is referred to as the rerouting switch.

Because of PROPERTY I above, the rerouting switch should lie on the upwards segment of the current route, so that it will have at least one alternative routing option. In an embodiment, the congested switch is on level X of the FT network. The congested switch chooses a switch in level X−1 that lies on the upwards segment of the current route, to serve as the rerouting switch. In accordance with PROPERTY III above, only a single switch in level X−1 lies on the upwards segment of the current route, and, for a given congested switch, the identity of this rerouting switch is uniquely defined by the identity of the source endpoint (and thus by the source address of the packets in the flow).

In some embodiments, each switch 24 holds a database or any other suitable data structure that records, per source address, the identity of the switch in the next-lower level that will serve as the rerouting switch. The database is typically stored in memory 48 of the switch. Note that a given source address may be mapped to different rerouting switches in the databases of different switches. In a given switch, however, each source address is mapped to a unique respective rerouting switch.

Each switch 24 may use any suitable technique for constructing the database, i.e., for obtaining a mapping between each source address and a respective rerouting switch in the next-lower level. In one embodiment, this mapping already exists in the switch—It is the same mapping used for forwarding packets in the opposite direction to this endpoint. Alternatively, the database may be pre-programmed into each switch, or learned adaptively during operation. In some embodiments, the addressing scheme used in network 20 is location-based, in which case database 24 may be simplified.

Thus, when a need arises to reroute a flow, the congested switch queries its database with the source address of the flow, and retrieves the identity (e.g., the address) of the rerouting switch. The congested switch then generates a notification packet, referred to as "adaptive routing notification (ARN)," "congestion notification" or simply "notification." The ARN comprises a unicast packet that is addressed individually to the specific rerouting switch selected by the congested switch.

The congested switch sends the ARN to the rerouting switch. The rerouting switch receives the ARN, and in response may reroute the flow to an alternative route that reaches the destination endpoint but does not traverse the congested switch. Note that, since the ARN is addressed explicitly to the rerouting switch, it can be forwarded to the rerouting switch over any desired route, not necessarily over the reverse direction of the route of the flow.

For example, with reference to FIG. 1, consider a scenario in which switch S4 (on the downwards segment of the current route from S to D marked in bold) is the congested switch. Switch S4 is in level L1, and therefore the rerouting switch is one of the switches in level L0. In accordance with the database in switch S4, the rerouting switch is necessarily switch S1. Switch S4 thus sends an ARN to switch S1. In response, switch S1 reroutes the flow to an alternative route (shown in dashed lines) that reaches endpoint D but does not traverse the congested switch S4.

Figure 2:
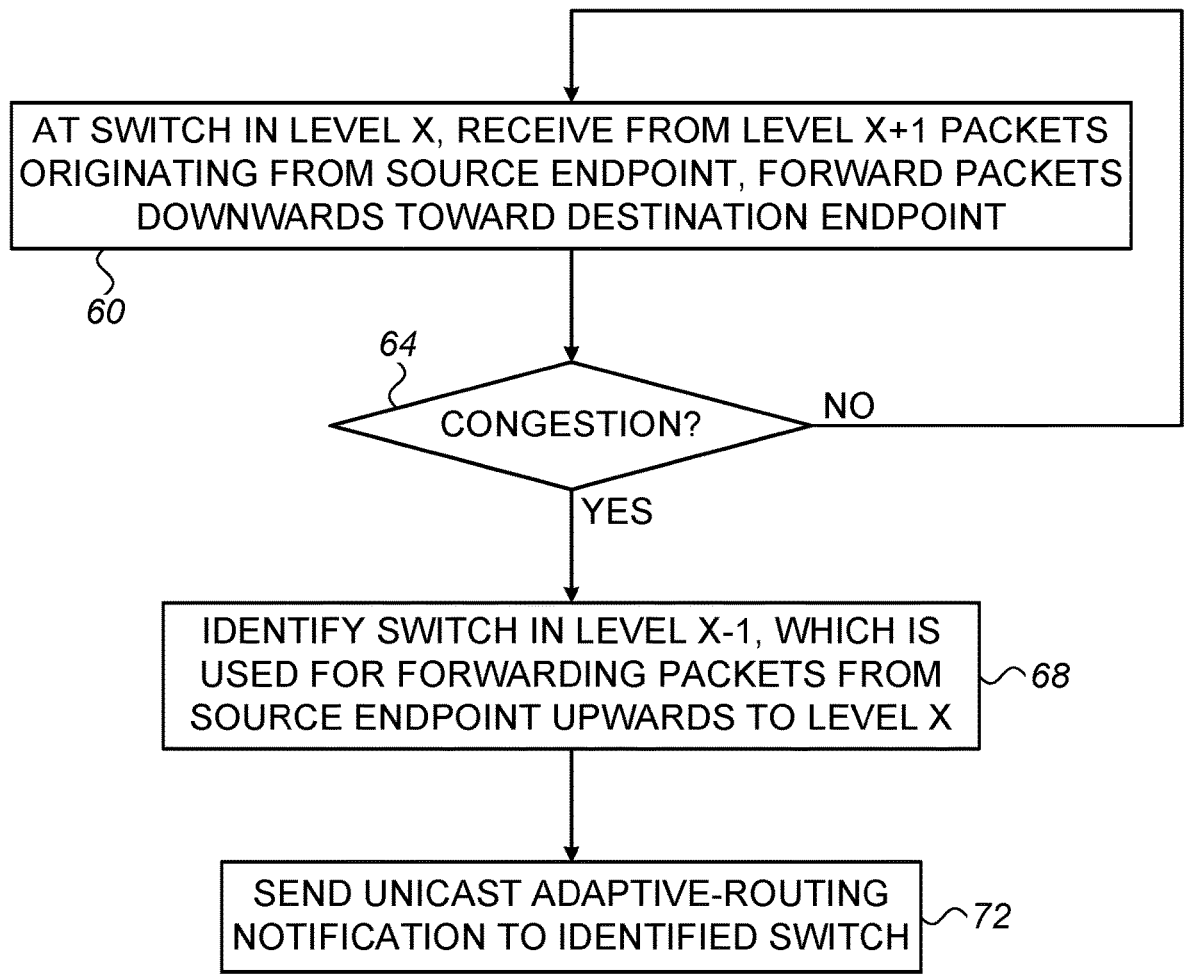
FIG. 2 is a flow chart that schematically illustrates a method for forwarding Adaptive-Routing Notifications (ARN) in a FT network, in accordance with an embodiment of the present invention.

FIG. 2 is a flow chart that schematically illustrates a method for forwarding ARNs in FT network 20, in accordance with an embodiment of the present invention. The method begins with a switch 24 at level X of FT network 20 receiving from level X+1 packets of a certain flow, at a packet reception step 60. The packets originate from source endpoint S, and are to be forwarded downwards to level X−1 en-route to destination endpoint S.

At a congestion checking step 64, the switch checks for congestion at the egress port designated for forwarding the packets of the flow. If no congestion exists, the method loops back to step 60 above.

If congestion is detected, the congested switch queries its database to identify the appropriate rerouting switch in level X−1, at a rerouting identification step 68. At a notification step 72, the congested switch generates and sends a unicast ARN, which is addressed individually to the identified rerouting switch. Subsequently, the rerouting switch receives the ARN and reroutes the flow.

In the example above, a congested switch in level X of the FT network selects a rerouting switch in level X−1. In alternative embodiments, a congested switch in level X may select a rerouting switch in any level that is lower than X, e.g., in level X−2 or X−3 (if such levels exist). The latter choice of rerouting switch will also result in a route that does not traverse the congested switch, but may also reroute some additional traffic that did not traverse the congested switch in the first place.

The examples above refer mainly to a congested switch in the downstream segment. In alternative embodiments, the disclosed techniques can also be carried out in a switch that is part of the upstream segment, but is nevertheless unable to reroute the traffic locally. For example, in such a switch all possible egress ports leading to the possible alternative routes may be congested. For example, the aggregate bandwidth over the upstream ports of the switch (the ports connecting to upper-level switches) may be smaller than the aggregate bandwidth over the downstream ports (the ports connecting to lower-level switches). This scenario is sometimes referred to as oversubscription. In such an embodiment, being aware of the network topology, the congested switch may select the previous switch in the upwards segment as the rerouting switch, and send a unicast ARN to that switch.

As noted above, the disclosed techniques are not limited to full FT networks. For example, in some embodiments the disclosed techniques are implemented in a quasi-FT network. Unlike full FT, in a quasi-FT network a switch in the downwards segment of a route may have one or more options for rerouting in case of congestion on the current egress port. In such cases, the terms "congestion" or "compromised ability to forward packets" refers to congestion or compromised ability on all possible egress ports. Moreover, in a quasi-FT network, for a given congested switch and a given source address, there may exist two or more rerouting switches. Thus, in some embodiments the congested switch identifies two or more rerouting switches, and sends a respective unicast ARN to each of them.

In some embodiments, source endpoint S is connected to two or more leaf switches in level L0, for example using different ports of a multi-port Network Interface Controller (NIC) of the endpoint. This sort of configuration is sometimes referred to as Multi-chassis Link Aggregation (MLAG). When using MLAG, packets originating from the source endpoint may enter network 20 via two or more different switches, and thus traverse two or more different routes to the destination endpoint D. Therefore, in these embodiments the congested switch identifies two or more rerouting switches (one per each of the two or more current routes from S to D), and sends the ARN to each of the rerouting switches.

Although the embodiments described herein refer mainly to congestion control, the disclosed techniques can also be used for mitigating failures such as port failure or link failure. In the present context, both congestion and failure are referred to herein as "compromised ability" of a switch to forward packets to a destination endpoint. Upon detecting compromised ability to forward packets, a switch may use the disclosed techniques for identifying a rerouting switch and sending a unicast ARN to the rerouting switch.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for communication in a communication network that includes network switches arranged in multiple levels, the method comprising:
   detecting, in a first network switch, a compromised ability of the first network switch to forward a flow of packets originating from a source endpoint to a destination endpoint over a route of network switches;
   in response to detecting the compromised ability, selecting, by the first network switch, a second network switch in the route, which is not an immediately previous hop in the route; and
   sending from the first network switch to the second network switch, a unicast notification addressed only to the second network switch, requesting the second network switch to reroute the flow.

2. The method according to claim 1, and comprising receiving the unicast notification by the second network switch, and, in response to the unicast notification, rerouting the flow to an alternative route.

3. The method according to claim 1, wherein sending the unicast notification comprises routing the unicast notification over a second route that differs from a reverse of the route.

4. The method according to claim 1, wherein the communication network has a Fat-Tree (FT) topology, wherein the multiple levels comprise at least a leaf level and a spine level, and wherein each route initially traverses a respective upwards segment that begins at the leaf level and traverses increasing levels, and then traverses a respective downwards segment that traverses decreasing levels and ends at the leaf level.

5. The method according to claim 1, wherein sending the unicast notification comprises holding in the first network switch a data structure that records, per endpoint, a respective address of a network switch that (i) is in the level that is one level below the first network switch and (ii) lies on the upwards segment of a route from that endpoint to the first network switch, querying the data structure for an address of the network switch associated with the source endpoint, and addressing the unicast notification to the queried address.

6. The method according to claim 5, wherein the data structure is also used for routing packets from the first network switch to destination endpoints.

7. A network switch in a communication network that includes network switches arranged in multiple levels, the network switch comprising:
   multiple ports, configured to exchange packets with the communication network; and
   packet processing circuitry, configured to:
      detect a compromised ability of the network switch to forward a flow of packets originating from a source endpoint to a destination endpoint over a route of network switches; and
      in response to detecting the compromised ability, select a second network switch in the route, which is not an immediately previous hop in the route, and send via one of the ports a unicast notification addressed only to the second network switch, requesting the second network switch to reroute the flow.

8. The network switch according to claim 7, wherein the packet processing circuitry is configured to send the unicast notification over a second route that differs from a reverse of the route of the flow.

9. The network switch according to claim 7, wherein the communication network has a Fat-Tree (FT) topology, wherein the multiple levels comprise at least a leaf level and a spine level, and wherein each route initially traverses a respective upwards segment that begins at the leaf level and traverses increasing levels, and then traverses a respective downwards segment that traverses decreasing levels and ends at the leaf level.

10. The network switch according to claim 7, wherein the packet processing circuitry is configured to hold in a data structure that records, per endpoint, a respective address of a network switch that (i) is in the level that is one level below the first network switch and (ii) lies on the upwards segment of a route from that endpoint to the first network switch, to query the data structure for an address of the network switch associated with the source endpoint, and to address the unicast notification to the queried address.

11. The network switch according to claim 10, wherein the packet processing circuitry is configured to use the data structure for routing packets from the network switch to destination endpoints.

12. A computer software product, the product comprising a tangible non-transitory computer-readable medium in which program instructions are stored, which instructions, when read by a processor in a first network switch that is part of a communication network including network switches arranged in multiple levels, cause the processor to:
   detect a compromised ability of the first network switch to forward a flow of packets originating from a source endpoint to a destination endpoint over a route of network switches; and
   in response to detecting the compromised ability, select a second network switch in the route, which is not an immediately previous hop in the route, and send a unicast notification addressed only to the second network switch, requesting the second network switch to reroute the flow.

13. The method according to claim 4, wherein the first network switch is located on the downwards segment of the route and wherein selecting the second network switch comprises selecting a network switch on an upwards segment of the route.

14. The method according to claim 4, wherein selecting the second network switch comprises selecting a network switch which belongs to a level of the communication network that is exactly one level below the first network switch.

15. The method according to claim 1, wherein selecting the second network switch comprises querying a database in the first network switch with an address of the source endpoint to receive an identity of the second network switch.

16. The method according to claim 1, wherein selecting the second network switch comprises querying a forwarding table in the first network switch.

* * * * *